Dec. 23, 1924.
A. LIND
SAW BLADE
Filed Oct. 13, 1922
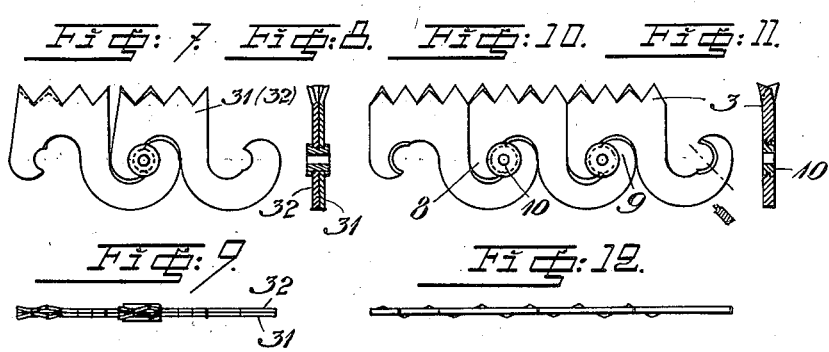
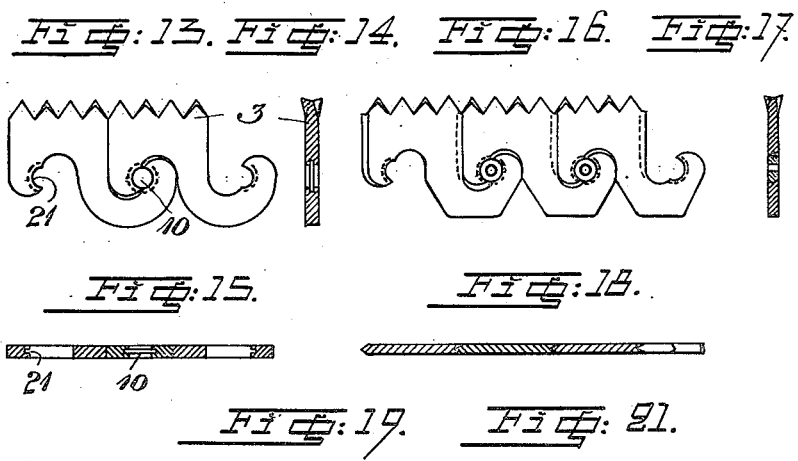
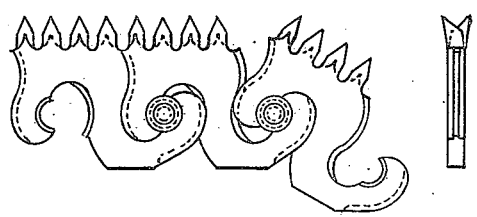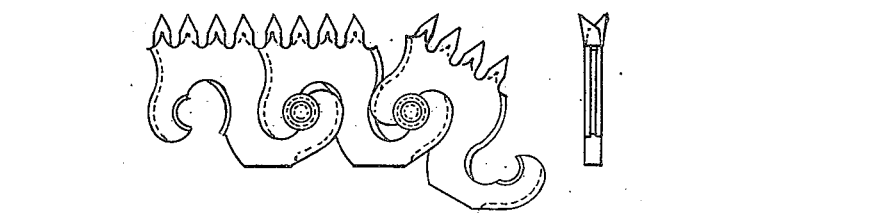
Inventor
Arvid Lind Patented Dec. 23, 1924.

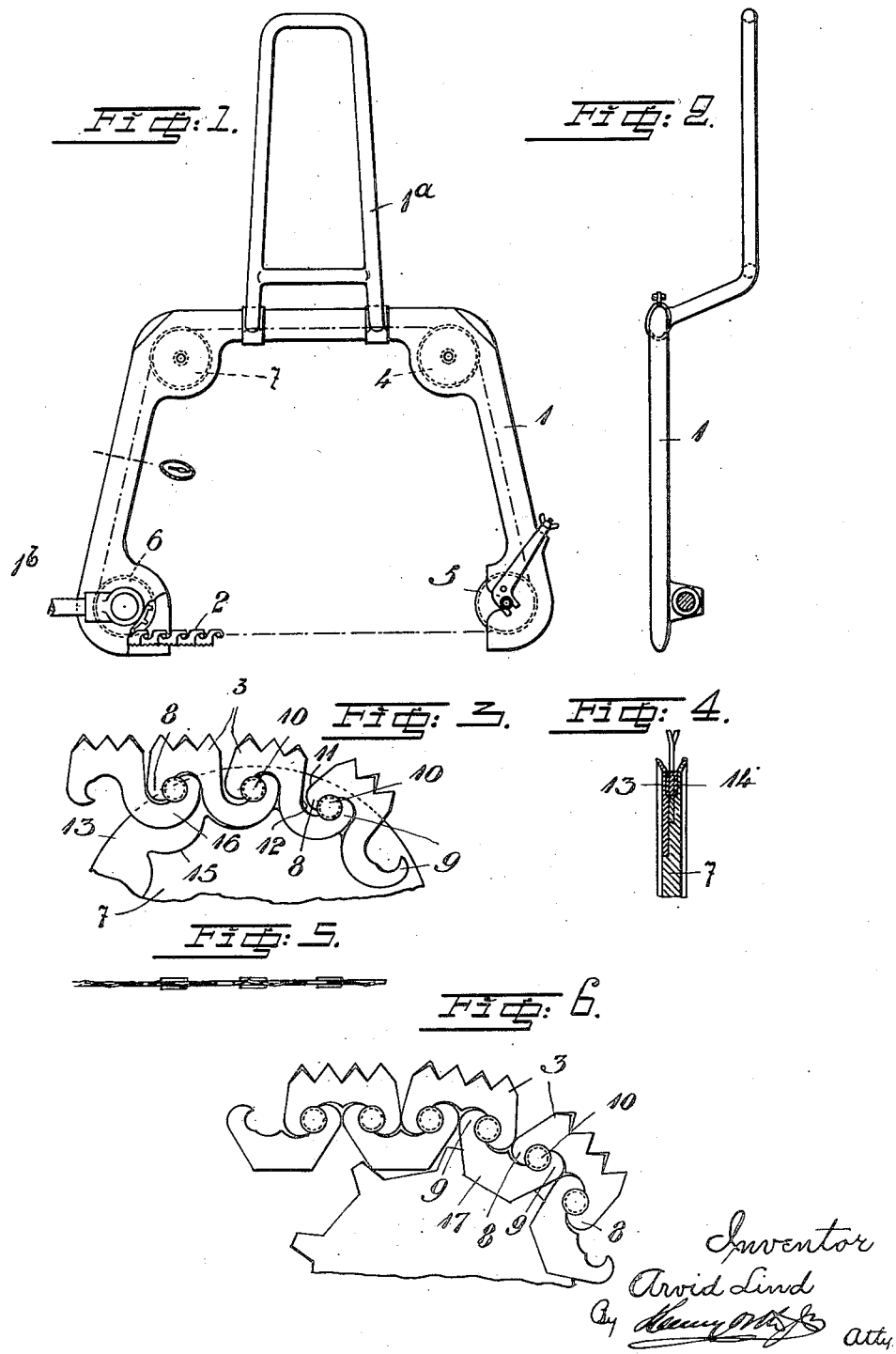

1,520,422

UNITED STATES PATENT OFFICE.

ARVID LIND, OF STOCKHOLM, SWEDEN.

SAW BLADE.

Application filed October 13, 1922. Serial No. 594,334.

*To all whom it may concern:*

Be it known that I, ARVID LIND, a citizen of the Kingdom of Sweden, residing at Stockholm, Sweden, have invented new and useful Improvements in Saw Blades, of which the following is a specification.

This invention relates generally to saws, and particularly to that class known as chain-saws.

The object of the invention is to provide a sectional saw-blade of the character specified which shall be adapted for use in band saws and especially in portable tree felling machines, which shall be simple of construction, thoroughly efficient and durable in use and in which the parts shall be so constructed and combined as to reduce liability of breakage in use to a minimum, and generally to improve and render more efficient saws of the above character.

The invention consists, chiefly, in providing a chain-saw composed of a plurality of sections having hooked ends and connecting pins between said ends forming journals for said ends. By the use of such connecting pins between the sections of the saw-blade the sections will be easy to disconnect from each to facilitate repairs when necessary and the saw will run easily and with small friction in the machine.

In the accompanying drawings I have shown some embodiments of my invention. Fig. 1 is a view in elevation of a portable tree feller having a sectional saw-blade according to my invention. Fig. 2 is a side-view thereof. Fig. 3 is a sectional view of a portion of a guiding disc with the saw-blade in the position when passing around said disc. Fig. 4 is a cross sectional view and Fig. 5 is a view in plan thereof. Fig. 6 is a side view of a second embodiment of the invention. Fig. 7 shows a side-view, Fig. 8 a sectional view, and Fig. 9 a view in plan of a third constructional form. Figs. 10 to 12, 13 to 15, 16 to 18, and 19 to 21 show corresponding views of four other embodiments of my invention.

Referring to Figs. 1 and 2 of the drawing, the tree felling machine consists of a frame 1 having a handle 1ª, and a sectional saw-blade 2 running on discs 4, 5, 6 and 7 of which the disc 6 serves as driving disc. The frame 1 is hollow so that the saw-blade runs fully protected therein. The driving power is supplied to the disc 6 through the shaft 1ᵇ from a suitable motor (not shown).

In the constructional form shown in Figs. 3 to 5 the saw-blade is composed of a plurality of toothed sections 3 each of which is provided with hooked ends 8 and 9 so that each section is essentially S-shaped. The hook 8 of one section is engaged by the hook 9 of the following section and between said hooks a disc-shaped pin 10 is provided, said pin being only slightly thicker than the blade sections and at its periphery provided with a groove engaged by the hooks 8, 9 so that an unintended disengagement of the sections is prevented. The disconnecting of the sections is also prevented because the rear edge 11 of each hook 11 lies nearly to the inner edge of the hook 12 of the following section. The guiding disc 3 of the saw-blade is suited to the form of the saw-blade inasmuch as it is provided with a groove at its periphery formed by high flanges 13, 14, the bottom of said groove having recesses 15 corresponding to the lowermost edge 16 of the hooks 9 engaging said recesses. As is evident from the drawings, all sections 3 lie in the same plane, the thickness of the saw-blade being accordingly not greater than that of a usual saw-blade. The setting of the teeth of the saw-blade is made so great that the cut made by them will be at least of the same width as the thickness of the pins 10 so that the latter do not cause any unnecessary friction.

In the embodiment shown in Fig. 6 the saw-blade is composed of toothed sections 3 and untoothed connecting links 17. All sections 3 have at their ends hooks 8 directed towards each other so that each section is essentially U-shaped and all connecting links 17 have similarly hooks 9 directed towards each other, which engage the hooks 8 of the toothed sections 3. Between the hooks 8 and 9 connecting pins 10 are provided in the same manner as in the constructional form shown in Figs. 3 to 5. The toothed sections 3 as well as the connecting links 17 lie in the same plane and the width of the cut is determined by the setting of the teeth of the sections 3.

If a rather wide cut is desired, the saw-blade is, preferably, made of double toothed links or sections which cover each other. Such constructional form is shown in Figs. 7 to 9. The sections of the saw-blade are here of essentially the same type as that shown in Figs. 3 to 5 but they are each composed of two toothed links 31, 32. The teeth of said links are, preferably, set in opposite directions, one tooth on each link being, preferably unset (see Fig. 8) so that the material in the cut which is not removed by the set teeth is removed by said unset teeth.

If the saw-blade sections are made of a rather thick material it is possible to avoid the pins reaching outside the plane of the saw-blade. Such constructional form is shown in Figs. 10 to 12. The pins 10 and the sections 3 of the saw-blade have here the same thickness, the engagement of the hooks 8, 9 being effected by the edges of the hooks being reduced to the same width as the grooves of the pins. In the constructional form shown in Figs. 13 to 15 the same effect is reached by the pins 10 being made of a thinner material than the sections of the saw-blade, grooves 21 being provided in the edges of the hooks 8, 9 which are engaged by the pins 10.

For obtaining a good steadiness sideways during the work of the saw-blade the sections may be constructed in such manner that their vertical sides engage each other. Such embodiment is shown in Figs. 16 to 18. In this constructional form one of the vertical sides of each section is edgy while the other opposed side of the following section has a groove engaged by the edgy side of the first mentioned section. The connecting pins 10 are constructed in a similar manner as shown in Fig. 17.

In all embodiments above described it is supposed that all parts are made ready beforehand, and that the connecting of the sections to an endless saw-blade takes place in such manner that a pin $a$ placed in engagement with a hook of one section whereupon the next section is joined in such manner that it is hooked on the pin while it is turned somewhat out of the plane of the blade and then turned into its right position in the plane of the blade. It is, however, also possible to connect the sections in such manner that the sections and the pins are hooked together and then the flanges of the pins or the hooks which effect the binding sideways are made by an up-setting or riveting operation. Or the pins may be made in two or more parts and riveted together between the sections when the latter have been hooked together. The latter embodiment is illustrated in Figs. 19 to 21. In this embodiment the edges of the sections as well as the hooks 9 are on one side V-shaped and on the other side correspondingly grooved so that a very good steadiness sideways is obtained by the fact that each section is engaged by the following section on both sides of the pin 10. The latter is made in two halves which are placed between the sections when the latter have been hooked together whereupon the said halves are fastened to each other by a central rivet.

What I claim is:—

1. A chain saw comprising a plurality of toothed sections having hooked ends with half-circular recesses, and disc-shaped pins engaged by said hooked ends from opposite sides in the same plane and forming journals for them.

2. A chain saw comprising a plurality of toothed sections having hooked ends with half-circular recesses and reduced edges, and grooved pins engaged by said hooked ends from opposite sides in the same plane and forming journals for them.

3. A chain saw comprising a plurality of toothed sections having tongued and grooved edges and hooked ends with half-circular recesses on the inner side, and disc-shaped pins engaged by said hooked ends from opposite sides in the same plane and forming journals for them.

In testimony whereof I have signed my name.

ARVID LIND.